United States Patent
Mueller et al.

(10) Patent No.: US 6,977,048 B2
(45) Date of Patent: *Dec. 20, 2005

(54) METHOD OF RECYCLING WATER CONTAMINATED OIL BASED DRILLING FLUID

(75) Inventors: Frank Manfred Franz Mueller, Stauanger (DE); Juergen Rudolph, Rieslingstrasse (DE)

(73) Assignee: M-I LLC, Houston, TX (US)

( * ) Notice: Subject to any disclaimer, the term of this patent is extended or adjusted under 35 U.S.C. 154(b) by 362 days.

This patent is subject to a terminal disclaimer.

(21) Appl. No.: 10/132,377

(22) Filed: Apr. 24, 2002

(65) Prior Publication Data

US 2003/0100452 A1 May 29, 2003

Related U.S. Application Data

(60) Provisional application No. 60/286,236, filed on Apr. 24, 2001.

(51) Int. Cl.[7] ................................................ B01D 17/05
(52) U.S. Cl. .................... 210/708; 175/66; 210/712; 210/728; 210/729; 516/146; 516/192
(58) Field of Search ........................ 175/66; 210/704, 210/705, 708, 713, 714, 725, 727, 728, 729, 734, 747, 787, 712; 516/135, 146, 168, 177, 179, 192

(56) References Cited

U.S. PATENT DOCUMENTS

| 4,269,271 | A |   | 5/1981  | Shupe et al. |
|-----------|---|---|---------|--------------|
| 5,006,239 | A | * | 4/1991  | Mishra ........................ 210/181 |
| 5,164,116 | A | * | 11/1992 | Berkhof et al. ............. 516/179 |
| 5,195,847 | A | * | 3/1993  | Guymon ................... 405/128.7 |
| 5,286,386 | A | * | 2/1994  | Darian et al. ................ 210/639 |
| 6,165,946 | A | * | 12/2000 | Mueller et al. ............. 507/203 |
| 6,267,716 | B1 | * | 7/2001 | Quintero ..................... 588/252 |
| 6,491,824 | B1 | * | 12/2002 | Lin et al. .................... 210/666 |

FOREIGN PATENT DOCUMENTS

WO          96/35040        11/1996     ........... E21B/43/22

* cited by examiner

Primary Examiner—Peter A. Hruskoci
(74) Attorney, Agent, or Firm—Howrey Simon Arnold & White LLP

(57) ABSTRACT

A method for recycling an invert emulsion based drilling fluid, in which the invert emulsion based drilling fluid includes an oil component and an aqueous component. The method includes: mixing the invert emulsion drilling fluid with a emulsion clearing agent, wherein the emulsion clearing agent is a mixture of an anionic tensid and a non-ionic tensid; and separating the oil component of the invert emulsion drilling fluid from the aqueous component of the invert emulsion drilling fluid. The method preferably utilizes an emulsion breaking agent that is a combination of an anionic tensid, a non-ionic tensid and an alkyl polyglycoside tensid.

17 Claims, No Drawings

METHOD OF RECYCLING WATER CONTAMINATED OIL BASED DRILLING FLUID

Priority of U.S. Provisional Patent Application No. 60/286,236, filed Apr. 24, 2001 is claimed.

BACKGROUND

Invert emulsion fluids, i.e. emulsions in which the aqueous fluid is the discontinuous phase and the oil fluid is the continuous phase, are employed in drilling processes for the development of oil or gas sources, as well as, in geothermal drilling, water drilling, geological survey drilling and mine drilling. Specifically, the invert emulsion fluids are conventionally utilized for such purposes as providing stability to the drilled hole, forming a thin filter cake, lubricating the drilling bore and the downhole area and assembly, and penetrating salt beds without sloughing or enlargement of the drilled hole.

Oil-based drilling fluids are generally used in the form of invert emulsion muds. An invert emulsion mud consists of three-phases: an oil phase, an aqueous phase and a finely divided particle phase. The percentage distribution of water and oil in the liquid phase can range from 50% oil:50% water to 95%:5%, although most invert emulsion muds range from 75:25 to 90:10. Also typically included are emulsifiers and emulsifier systems, weighting agents, fluid loss additives, viscosity regulators and the like, for stabilizing the system as a whole and for establishing the desired performance properties. Full particulars can be found, for example, in the Article by P. A. Boyd et al. entitled "New Base Oil Used in Low-Toxicity Oil Muds" in the Journal of Petroleum Technology, 1985, 137 to 142 and in the Article by R. B. Bennet entitled "New Drilling Fluid Technology-Mineral Oil Mud" in Journal of Petroleum Technology, 1984, 975 to 981 and the literature cited therein.

During the drilling process, it is not uncommon for the drilling fluid to encounter a water-bearing formation and thus the ratio of oil fluid to aqueous fluid is less than optimal. In some cases, the oil water ratio becomes so out of balance that the mud becomes too thick to use, creating ting a difficult-to-break emulsion. This out-of-balance mixture of drilling fluid and water is often referred to as the "slop". The oil to water ratio in the slop may be 25/75 or 30/70 or similar such numbers. Conventionally, this slop is diluted with make-up oil to achieve the desired ratio, typically 80/20. The large amount of oil required and the resulting large inventory of mud create both storage and opportunity costs.

SUMMARY OF THE INVENTION

The present invention is generally directed to method of recycling invert emulsion drilling fluids or muds that have been contaminated with excess water so as to obtain a fluid that is suitable for reuse in the drilling subterranean wells. More particularly, the present invention relates to a method of separating the excess water from the oil portion of the invert emulsion using chemical emulsion clearance agent or agents that release incorporated water without completely breaking the water-in-oil emulsion characteristic of the fluid. Even more particular is a process of using a chemical emulsion clearing agent or agents that are biodegradeable to release excess water, and so be environmentally compatible. The emulsion clearance agents or agents may include an anionic surfactant, a nonionic surfactant, and an alkyl polyglycoside, or combinations thereof applied individually or as mixtures.

DETAILED DESCRIPTION OF THE INVENTION

The invention represents a method of separating contaminating water from the oil liquid portion of invert emulsion drilling fluids, commonly called muds, using a chemical emulsion clearance agent or agents (ECA), especially ECA that are environmentally compatible.

The components of the invert emulsion fluids utilized in the method of the present invention generally include an oil liquid such as hydrocarbon oil which serves as a continuous phase, a aqueous liquid such as water or brine solution which serves as a discontinuous phase, and an emulsifying agent. As used herein, emulsifying agent and surfactant are used interchangeably to describe the surface active agents used to create the inverse emulsion drilling fluid, and the term tensid refers to the surface active agents used in invention to remove excess water from invert emulsion drilling fluids. The term tensid used in this invention refers to the surfactants used in this invention to remove water from, for example, slop, as differentiated from the surfactants used to prepare the mud. The emulsifying agent serves to lower the interfacial tension of the liquids so that the aqueous liquid may form a stable dispersion of fine droplets in the oil liquid. A full description of such invert emulsions may be found in *Composition and Properties of Drilling and Completion Fluids,* 5th Edition, H. C. H. Darley, George R. Gray, Gulf Publishing Company, 1988, pp. 328–332, the contents of which are hereby incorporated by reference.

As used herein, the term "invert emulsion" is an emulsion in which an aqueous fluid is the discontinuous phase and an oil fluid is the continuous phase. The invert emulsion fluids of the present invention are useful in a similar manner as conventional invert emulsion fluids which includes utility in preparation for drilling, drilling, completing and working over subterranean wells such as oil and gas wells. Such methods of use of conventional inverse emulsion fluids are described in, for example, *Composition and Properties of Drilling and Completion Fluids,* 5th Edition, H. C. H. Darley, George R. Gray, Gulf Publishing Company, 1988, the contents which are incorporated by reference, as well as, U.S. Pat. No. 5,254,531 and EP 271943 which are incorporated by reference. One of skill in the art should know and understand the standard methods of determining if an invert emulsion has been formed. Examples of two such tests for the formation of an invert emulsion include the Invert Emulsion Test as disclosed herein and the measurement of the electrical stability of the invert emulsion.

As used herein the term "oil liquid" means an oil which is a liquid at 25° C. and immiscible with water. Oil liquids typically include substances such as diesel oil, mineral oil, synthetic oil, ester oils, glycerides of fatty acids, aliphatic esters, aliphatic ethers, aliphatic acetals, or other such hydrocarbons and combinations of these fluids.

The amount of oil liquid in the invert emulsion fluid may vary depending upon the particular oil fluid used, the particular aqueous fluid used, and the particular application in which the invert emulsion fluid is to be employed. However, generally the amount of oil liquid must be sufficient to form a stable emulsion when utilized as the continuous phase. Typically, the amount of oil liquid is at least about 30, preferably at least about 40, more preferably at least about 50 percent by volume of the total fluid.

As used herein, the term "aqueous liquid" means any substance which is a liquid at 25° C. and which is not an oil liquid as defined above. Aqueous liquids are immiscible with oil liquids but capable of forming emulsions therewith.

Typical aqueous liquids include aqueous substances such as fresh water, sea water, brine containing inorganic or organic dissolved salts, aqueous solutions containing water-miscible organic compounds and mixtures of these. In one illustrative embodiment the aqueous fluid is brine solution including inorganic salts such as calcium halide salts, zinc halide salts, alkali metal halide salts and the like.

The amount of aqueous liquid in the invert emulsion fluid may vary depending upon the particular aqueous fluid used and the particular application in which the invert emulsion fluid is to be employed. Typically, the amount of aqueous liquid is at least about 1, preferably at least about 3, more preferably at least about 5 percent by volume of the total fluid. Correspondingly, the amount should not be so great that it cannot be dispersed in the oil phase. Therefore, typically the amount of aqueous liquid is less than about 90, preferably less than about 80, more preferably less than about 50 percent by volume of the total fluid.

Various surfactants and wetting agents conventionally used in invert emulsion fluids may be incorporated in the fluids. Such surfactants are, for example, fatty acids, soaps of fatty acids, amido amines, polyamides, polyamines, oleate esters, imidazoline derivatives, oxidized crude tall oil, organic phosphate esters, alkyl aromatic sulfates and sulfonates, as well as, mixtures of the above. Generally, such surfactants are employed in an amount sufficient to form the invert emulsion. However, due to the cost of such agents, a minimal amount to achieve the desired result is typically used.

Viscosifying agents, for example, organophillic clays, may optionally be employed in the invert drilling fluid composition. Usually, other viscosifying agents, such as oil soluble polymers, polyamide resins, polycarboxylic acids and fatty acid soaps may also be employed. The amount of viscosifying agent used in the composition will necessarily vary depending upon the end use of the composition. Usually such viscosifying agents are employed in an amount which is at least about 0.1, preferably at least about 2, more preferably at least about 5 percent by weight to volume of the total fluid. VG-69™ and VG-PLUS™ are organoclay materials and Versa HRP™ is a polyamide resin material manufactured and distributed by M-I L.L.C. which are suitable viscosifying agents.

The invert emulsion drilling fluids utilized in the practice of the present invention may optionally contain a weight material. The quantity and nature of the weight material depends upon the desired density and viscosity of the final composition. The preferred weight materials include, but are not limited to, barite, calcite, mullite, gallena, manganese oxides, iron oxides, mixtures of these and the like. The weight material is typically added in order to obtain a drilling fluid density of less than about 24, preferably less than about 21, and most preferably less than about 19.5 pounds per gallon.

Fluid loss control agents such as modified lignite, polymers, oxidized asphalt and gilsonite may also be added to the invert drilling fluids subject to this invention. Usually such fluid loss control agents are employed in an amount which is at least about 0.1, preferably at least about 1, more preferably at least about 5 percent by weight to volume of the total fluid.

The method of preparing the drilling fluids for use in the present invention is not particularly critical so long as an invert emulsion is formed. Generally, the components may be mixed together in any order under agitation condition. A representative method of preparing said invert emulsion fluids comprises mixing an appropriate quantity of oil fluid and an appropriate quantity of surfactant together with continuous, mild agitation. An aqueous fluid is then added while mixing until an invert emulsion is formed. If weight material, such as those described below, are to be added, then the weight material is typically added after the invert emulsion fluid is formed.

Once used in the drilling process, it is not uncommon for the drilling fluid to encounter a water bearing formation and thus the ratio of oil fluid to aqueous fluid is less than optimal. In some cases, the formation of a difficult to break emulsion occurs and this is often referred to as the "slop". The oil to water ratio in the slop may be 25/75 or 30/70 or similar such numbers. This is then diluted with additional make up oil to achieve the desired ratio, typically 80/20. To increase the ratio from 30/70 to 80/20 in one barrel of water-contaminated mud can take up to an additional 2.5 bbl of oil. This large amount of oil ties up expensive inventory in the recovered mud, requires the addition of costly emulsifiers and surfactants to assure emulsion stability, and incurs storage charges for the up to 350% expanded volume. The present invention overcomes these limits by using a combination of anionic tensids and non-ionic tensids as the emulsion clearing system. The anionic tensids include alkylsulfates, alkylsulfonates, and alkylarylsulfonates. The non-ionic tensids include the subset of alkyl polyglycosides, ethoxylated alcohols, ethoxylate ethers, where ethoxylated includes not only the reaction products with ethylene oxide but also products of propylene oxide, butylenes oxide or mixtures there of. Alkyl polyglycosides, also referred to as sugar tensids, are commercially available substances that are produced by acid-catalyzed reaction of glycosides and fatty alcohol. Alkyl polyglycosides are environmentally friendly and are utilized in the personal body care and food industries. The biodegradation test used for alkyl polyglyosides is defined in OECD guidelines No. 301D. Alkyl sulfonates, alkyl sulfates, and alkyl aryl sulfonates are also commercial available substances, long used as cleaning agents and other surface-active applications, well known to those schooled in the art.

The alkyl sulfates of the present invention have the formula:

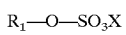

where $R_1$ is a linear or branched, saturated or unsaturated $C_{1-22}$ alkyl radical and X is an alkali or ammonium ion.

The alkyl sulfonates of the present invention have the formula:

or

where $R_2$ is a $C_{1-18}$ alkyl radical, $R_3$ is a linear or branched, saturated or unsaturated $C_{1-30}$ alkyl radical, and Y is an alkali or ammonium ion.

The alkyl aryl sulfonates of the present invention have the formula:

where $R_4$ is a $C_{1-16}$ alkyl radical, A is an aryl group, and Y is an alkali or ammonium ion.

The nonionic surfactants of the present invention have the formula:

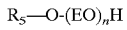

or

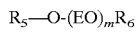

where $R_5$ is a liner or branched, saturated or unsaturated $C_{1-22}$ alkyl radical, $R_6$ is a liner or branched alkyl radical, saturated or unsaturated $C_{1-22}$ alkyl radical, n is a number from 1 to 5, EO is an ethylene oxide radical, propylene oxide radical, or butylene oxide radical or mixture thereof and m is a number from 1 to 50.

The alkyl polyglocosides (also sugar surfactants) of the present invention have the formula:

where $R_7$ is a linear or branched, saturated or unsaturated $C_{1-22}$ alkyl radical or mixture thereof, G is a glucose unit, and n is a number from 1 to 10.

The tensids of the present invention may be present in an amount of about 0.01 to about 15% by volume of the total fluid to be treated. A preferred amount is about 0.5 to about 10% by volume with about 1.0 to about 5% being the most preferred amount.

As presented in the following examples this combination of components is referred to as WIGOL EMD 2+2 available from WIGOL of Worms Germany. EMD is an anionic tensid containing an alcohol (propane-2-ol), an alkane sulfonate (CAS # 85711-69-9), and an alkylglucoside. The sugar tensid, AG 6202, is available from AKZO NOBEL, Sweden. RENAX is an anionic tensid available from Lilleborg AS, Oslo, Norway. It contains an alkylbenzensulfonate Na-salt (CAS # 69669-44-9), an alkyl glucoside tensid, ethanol, and water (CAS # 7732-18-5). Generally the method involves taking the slop material, adding the emulsion clearance agent (e.g. WIGOL EMD 2+2) and allowing the emulsion to settle out, producing a supernatant water phase. This may take anywhere from less than about one hour to more than about 14 hours. The supernatant water phase is then pumped out and the oil fluid and desired drilling fluid solids are retained and recycled. In practicing the present method any conventional method of settling and separation may be used. For quickly separating emulsions a cyclone separator may be used. Otherwise settling tanks or other similar separation devices can be used. Occasionally, overtreatment or overlong settling time may produce a small amount of floating oil which does not interfere with the recovery.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

EXAMPLE 1

The slop mud utilised the following laboratory tests are drilling fluids contaminated with water as substantially described above, with an Oil/Water Ratio (OWR) of approximately 32/68 and OWR 50/50, and are referred to as SLOP 31/69 and SLOP 50/50, respectively.

| Test Fluid | Slop 31/69 | Slop 50/50 |
|---|---|---|
| Density (at RT) | 1.21 | 1.18 |
| OWR | 31/69 | 50/50 |
| Dry Material % wt | 10 | 10–15 |

Emulsion Clearance Agent: The emulsion clearance agents first tried were an industrial cleaning agent based on primarily anionic tensids with some non-ionic tensid components (RENAX) and a sugar tensid (AG 6202), being applied as follows: RENAX+AG 6202. The amount of RENAX is 2% by volume and the amount of AG 6202 is also 2% by volume. Additional preferred of Emulsion Clearance Agents (ECA) were tested as shown below:

| ECA | Wigol Art. No. | PH-Value | Basis |
|---|---|---|---|
| EMD, | 001355 | 7.5 | Anionic Tensid |
| EMD 2 + 2, | 001357 | 7.5 | Anionic Tensid Sugar Tensid |
| EMD 8.2 | | 3.0 | Anionic Tensid Non-ionic Tensid Sugar Tensid |
| EMD 8.6 | | 3.0 | Anionic Tensid Non-ionic Tensid Sugar Tensid |

A measured quantity of process mud (i.e 100 g) was placed into a beaker together with a measured portion of the emulsion clearance agent. The mixture was blended with a mechanical mixer for one minute. The separated water layer was decanted after a settling time of several hours.

The composition of the remaining Oil/Water (O/W) emulsion was measured by means of distillation as normally used to characterize invert-emulsion drilling fluids (ROFI) using a 50 g sample of the treated drilling mud. The volume of the separated Oil/Water layer was measured in the distillate.

Test with Slop 50/50

The test results for SLOP 50/50 are presented in Table No. 1. The demulsified quantity of water in the precipitated mud DGW was measured after 2, 4 and 14 hours.

TABLE No. 1

Tests with Slop 50/50.

| Test No. | Starting weight Slop 50/50 [g] | Emulsion Clearance Agent | Co-ECA | Amount [g] | Separated water [g] at 2 h standing | Separated water [g] at 4 h | Separated water [g] at 14 h |
|---|---|---|---|---|---|---|---|
| 001 | 100 | RENAX | AG6202 | 2 + 2 | 7.9 | 19.6 | 25.6 |
| 002 | 100 | EMD | AG6202 | 2 + 2 | 19.5 | 19.5 | 19.8 |

TABLE No. 1-continued

Tests with Slop 50/50.

| Test No. | Starting weight Slop 50/50 [g] | Emulsion Clearance Agent | Co-ECA | Amount [g] | Separated water [g] at 2 h standing | Separated water [g] at 4 h | Separated water [g] at 14 h |
|---|---|---|---|---|---|---|---|
| 003 | 100 | EMD 2 + 2 | | 4 | 18.4 | 24.6 | 25.0 |
| 004 | 100 | EMD 8.6 | | 4 | 21.5 | 22.7 | 23.0 |
| 005 | 100 | EMD 8.2 | | 4 | | | 28.0 |

After 14 hours 25 grams of water is separated from both the WIGOL-Formula EMD 2+2 and from the RENAX Formula. One of skill in the art should appreciate that this corresponds to a theoretical OWR of 67/33. Under laboratory conditions, and with 4% additive, one of skill in the art should also appreciate that a very high degree of water extraction from the water-in-oil emulsion, even if the maximum amount required 12 to 24 hours standing. The additive EMD 8.2 showed the highest volume of separated water (OWR 70/30).

Test with Slop 30/70

The test results for SLOP 30/70 are presented in Table No. 2. The separated water and the Oil/Water ratio of the settled mud were measured after 14 hours.

TABLE 2

Tests with Slop 30/70.

| Test No. | Starting Weight Slop 50/50 [g] | Emulsion Clearance Agent | Co-ECA | Amount [g] | Separated water [g] 14 h | OWR Oil/ Water [vol %] |
|---|---|---|---|---|---|---|
| 2.1 | 100 | Renax | AG6202 | 2 + 2 | 39.1 | 55/45 |
| 2.2 | 100 | EMD | AG6202 | 2 + 2 | 40.0 | |
| 2.3 | 100 | EMD 2 + 2 | | 4 | 44.0 | |
| 2.4 | 100 | EMD 8.6 | | 4 | 44.0 | |
| 2.5 | 100 | EMD 8.2 | | 4 | 46.6 | 73/27 |
| 2.6 | 200 | EMD 2 + 2 | | 4 | 90.0 | |
| 2.7 | 200 | EMD 2 + 2 | | 2 | 96.5 | 75/25 |
| 2.8 | 200 | EMD 2 + 2 | | 1 | 93.4 | 73/27 |
| 2.9 | 100 | EMD 8.6 | | 1 | 45.3 | |
| 2.10 | 100 | EMD 8.2 | | 1 | 46.6 | 73/27 |

Upon review of the above results, one of skill in the art should appreciate that the EMD 2+2, EMD 8.2, and EMD 8.6, with a concentration of 1–4%, performed better when compared to the first agent (RENAX) It should also be appreciated that the use of EMD 2+2 on Slop 30/70 exhibited an increased efficiency of about 35% when compared to the first emulsion clearing agent (RENAX). Further it should be noted by one of skill in the art that the highest oil to water ratio obtained during the laboratory test was 75/25. Thus, in relation to the combination RENAX/AG6202, one can reasonably conclude that the applied quantity of a demulsification agent may be reduced by 50% and still achieve the results of the first (RENAX) emulsion clearing agent.

While the apparatus, compositions and methods of the present invention have been described in terms of illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention s defined by the following claims.

What is claimed is:

1. A method of recycling an invert emulsion based drilling fluid, wherein the invert emulsion based drilling fluid includes an oil component and an aqueous component, the method comprising: mixing said invert emulsion drilling fluid with a emulsion clearing agent, wherein said emulsion clearing agent comprises a mixture of a non-ionic tensid and an anionic tensid selected from the group consisting of alkyl sulfates, alkyl sulfonates and alkyl aryl sulfonates wherein the non-ionic tensid is an alkyl polyglycoside; substantially separating the aqueous component of the invert emulsion drilling fluid from the oil component of the invert emulsion drilling fluid, and recycling the oil component for reuse in drilling subterranean wells.

2. The method of claim 1, wherein the anionic tensid is selected from the group consisting of: an alkyl sulfate with the formula $$R_1\text{—}O\text{—}SO_3X$$

where $R_1$ is a linear or branched, saturated or unsaturated $C_{1-22}$ alkyl radical and X is an alkali or ammonium ion; an alkyl sulfonate with the formula $$R_2\text{—}SO_3Y$$

where $R_2$ is a $C_{1-30}$ alkyl radical, and Y is an alkali or ammonium ion; and an alkyl aryl sulfonate with the formula:

$$R_4\text{-}A\text{-}SO_3Y$$

where $R_4$ is a $C_{1-22}$ alkyl radical, A is an aryl group, and Y is an alkali or ammonium ion; and mixtures thereof.

3. The method of claim 1 wherein the alkyl polyglycoside has the formula:

$$R_7\text{—}O\text{-}G_n$$

where $R_7$ is a linear or branched, saturated or unsaturated $C_{1-22}$ alkyl radical, G is a glycose unit, and n is an integer from 1 to 10.

4. The method of claim 1 wherein the mixture further comprises a non-ionic tensid is selected from the group consisting of non-ionic tensids with the formula $$R_5\text{—}O\text{-}(EO)_nH$$

where $R_5$ is a liner or branched saturated or unsaturated $C_{1-22}$ alkyl radical, n is a number from 1 to 5, end EO is an ethylene oxide radical, propylene oxide radical, or butylene oxide radical or mixture thereof; and $$R_5\text{—}O\text{-}(EO)_mR_6$$

where $R_5$ is a linear or branched, saturated or unsaturated $C_{1-22}$ alkyl radical, $R_6$ is a linear or branched alkyl radical, saturated or unsaturated $C_{1-22}$ alkyl radical, EO is an ethylene oxide radical, propylene oxide radical, or butylene oxide radical or mixture thereof and m is a number from 1 to 50, and mixtures thereof.

5. The method of claim 1, wherein the emulsion clearing agent is a combination of an anionic tensid, a non-ionic tensid and an alkyl polyglycoside tensid.

6. The method of claim 1, wherein the separating of the water component from the invert emulsion component is accomplished in a settling tank.

7. The method of claim 1, wherein the separating of the water component from the invert emulsion component is accomplished by a cyclone separator.

8. The method of claim 1, wherein invert emulsion has an oil to water ratio of about 10/90 to about 90/10.

9. The method of claim 1, wherein the invert emulsion further contains a weighting material, said weighting material being selected from barite, calcite, mullite, gallena, manganese oxides, iron oxides, and mixtures of these.

10. The method of claim 1, wherein the oil component of the invert emulsion drilling fluid is selected from diesel oil, mineral oil, synthetic oil, $C_{10}$–$C_{19}$ alkyl and alkylene hydrocarbons, ester oils, glycerides of fatty acids, aliphatic esters, aliphatic ethers, or aliphatic acetals, or combinations of these.

11. The method of claim 1, wherein the emulsion clearing agent is a combination of an anionic tensid, a non-ionic tensid and a sugar tensid.

12. The method of claim 1, wherein the anionic tensid and nonionic tensid are present in a combined amount of about 0.01 to about 15% by volume of the total liquid treated.

13. The method of claim 1, wherein the anionic tensid and nonionic tensid are present in a combined amount of about 0.1 to about 10% by volume of the total liquid treated.

14. The method of claim 1, wherein the anionic tensid and nonionic tensid are present in a combined amount of about 1.0 to about 5% by volume of the total liquid treated.

15. A method of dewatering a used invert emulsion drilling fluid, wherein the used invert emulsion drilling fluid includes an oil component and an aqueous component, the method comprising: mixing said used invert emulsion drilling fluid with a emulsion clearing agent, wherein the emulsion clearing agent is a combination of an anionic surfactant selected from the group consisting of alkyl sulfates, alkyl sulfonates and alkyl aryl sulfonates, a non-ionic surfactant and an alkyl polyglycoside surfactant; substantially separating the aqueous component of the used invert emulsion drilling fluid from the oil component of the used invert emulsion drilling fluid to give a dewatered invert emulsion, and reusing the dewatered invert emulsion in drilling subterranean wells.

16. The method of claim 15, wherein the anionic surfactant is selected from the group consisting of:

an alkyl sulfate with the formula $$R_1\text{—O—SO}_3X$$

where $R_1$ is a linear or branched, saturated or unsaturated $C_{1-22}$ alkyl radical and X is an alkali or ammonium ion;

an alkyl sulfonate with the formula $$R_2\text{—SO}_3Y$$

where $R_2$ is a $C_{1-30}$ alkyl radical, and Y is an alkali or ammonium ion; and an alkyl aryl sulfonate with the formula:

$$R_4\text{-A-SO}_3Y$$

where $R_4$ is a $C_{1-22}$ alkyl radical, A is an aryl group, and Y is an alkali or ammonium ion; and mixtures thereof.

17. The method of claim 16, wherein the non-ionic surfactant is selected from the group consisting of non-ionic surfactants with the formula $$R_5\text{—O-(EO)}_n H$$

where $R_5$ is a liner or branched, saturated or unsaturated $C_{1-22}$ alkyl radical, n is a number from 1 to 5, and EO is an ethylene oxide radical, propylene oxide radical, or butylene oxide radical or mixture thereof; and $$R_5\text{—O-(EO)}_m R_6$$

where $R_5$ is a linear or branched, saturated or unsaturated $C_{1-22}$ alkyl radical, $R_6$ is a linear or branched alkyl radical, saturated or unsaturated $C_{1-22}$ alkyl radical, EO is an ethylene oxide radical, propylene oxide radical, or butylene oxide radical or mixture thereof and m is a number from 1 to 50, and mixtures thereof.

* * * * *